US011097846B2

(12) United States Patent
Madrigal et al.

(10) Patent No.: US 11,097,846 B2
(45) Date of Patent: Aug. 24, 2021

(54) RECLINER SOFA SYSTEM FOR ECONOMY CLASS SEAT

(71) Applicant: Safran Seats USA LLC, Gainesville, TX (US)

(72) Inventors: Jose Madrigal, Chihuahua (MX); Dafne Diaz, Chihuahua (MX); Teresa Antillon, Chihuahua (MX); Mario Herrera, Chihuahua (MX); Raul Daniel Flores Aguirre, Royals Versailles (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/758,165

(22) PCT Filed: Apr. 2, 2018

(86) PCT No.: PCT/US2018/025723
§ 371 (c)(1),
(2) Date: Apr. 22, 2020

(87) PCT Pub. No.: WO2019/089075
PCT Pub. Date: May 9, 2019

(65) Prior Publication Data
US 2020/0331613 A1 Oct. 22, 2020

Related U.S. Application Data

(60) Provisional application No. 62/579,365, filed on Oct. 31, 2017.

(51) Int. Cl.
*B64D 11/06* (2006.01)
*B60N 2/90* (2018.01)

(52) U.S. Cl.
CPC .......... *B64D 11/0643* (2014.12); *B60N 2/995* (2018.02)

(58) Field of Classification Search
CPC ........................... B64D 11/0643; B60N 2/995
(Continued)

(56) References Cited

U.S. PATENT DOCUMENTS 226,729 A   4/1880   Eastman
1,548,334 A   8/1925   Sebell
(Continued)

FOREIGN PATENT DOCUMENTS

DE   3842733 A1   6/1990
DE   10143807 A1   3/2003
(Continued)

OTHER PUBLICATIONS

International Patent Application No. PCT/US2018/025723, International Search Report and Written Opinion, dated Jul. 12, 2018.

*Primary Examiner* — Anthony D Barfield
(74) *Attorney, Agent, or Firm* — Kilpatrick Townsend & Stockton LLP (57) ABSTRACT

A passenger seat with a recliner sofa system includes a passenger seatback with a seatback frame and a seatback cushion. The seatback cushion is rotatable relative to the seatback frame between a stowed configuration and a deployed configuration. In some examples, in the deployed configuration, the seatback cushion extends through the seatback frame. In various examples, in the deployed configuration, the seatback cushion of a forward passenger seat abuts a seat base of an aft passenger seat. In certain examples, a method of reclining a passenger seat with a recliner sofa system includes rotating a seatback cushion of a seatback of a passenger seat relative to a seatback frame of the seatback of the passenger seat, and positioning the (Continued)

seatback cushion relative to the seatback frame such that a portion of the seatback cushion extends through the seatback frame.

18 Claims, 6 Drawing Sheets

(58) Field of Classification Search
USPC .................................................. 297/378.1
See application file for complete search history.

(56) References Cited

U.S. PATENT DOCUMENTS

| RE17,755 | E | 7/1930 | Graham |
|---|---|---|---|
| 3,761,124 | A | 9/1973 | Weik |
| 5,690,384 | A | 11/1997 | Rossi |
| 5,740,989 | A | 4/1998 | Daines |
| 5,758,924 | A | 6/1998 | Vishey |
| 6,079,773 | A | 6/2000 | Hassan |
| 6,082,815 | A | 7/2000 | Xiromeritis |
| 6,869,121 | B2 | 3/2005 | Kayumi |
| 6,877,807 | B2 | 4/2005 | Mizuno |
| 8,888,189 | B2 | 11/2014 | Tamura |
| 8,936,214 | B2 | 1/2015 | Foucher |
| 9,650,145 | B2 | 5/2017 | Lambert |
| 10,336,262 | B2 | 7/2019 | Mozurkewich |
| 2004/0051003 | A1 | 3/2004 | Cheung |
| 2008/0315637 | A1 | 12/2008 | Ghisoni |
| 2010/0194133 | A1 | 8/2010 | Nakamura |
| 2014/0132040 | A1 | 5/2014 | Arakawa |

FOREIGN PATENT DOCUMENTS

| JP | H0681822 U | 11/1994 |
|---|---|---|
| WO | 2019089075 A1 | 5/2019 |

RECLINER SOFA SYSTEM FOR ECONOMY CLASS SEAT

REFERENCE TO RELATED APPLICATIONS

This application claims the benefit of U.S. Provisional Application No. 62/579,365, filed Oct. 31, 2017, and entitled RECLINER SOFA SYSTEM FOR ECONOMY CLASS SEAT, the content of which is hereby incorporated by reference in its entirety.

FIELD OF THE INVENTION

This application relates to passenger seats, and more particularly to a recliner sofa system for a passenger seat.

BACKGROUND

Passenger vehicles, such as aircraft, buses, trains, ships, and automobiles, include passenger seats for passengers to sit in and utilize during travel. Sometimes, passenger seats are subdivided into classes based on the amount of living space offered by the particular seat. For example, in recent years, some airlines have offered first class seats (having the most living space), business class seats (having moderate living space), premium economy seats (having reduced living space), and regular economy seats (having the least amount of living space). In the economy class, the passenger's space and comfort is severely constrained by commercial considerations because airlines are forced to continuously reduce living space by introducing more seats to achieve a desirable level or revenue. Such limited space and comfort generally limits basic activities of a passenger in the seat such as sleeping or stretching. On the other hand, economy class seats that are not sold represent lost revenue for the airline. Therefore, there is still a need for a passenger seat that enhances the passenger's comfort while providing the airlines with new revenue streams.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a passenger seat includes a passenger seatback, the passenger seatback including a seatback frame and a seatback cushion. The seatback cushion is rotatable relative to the seatback frame between a stowed configuration and a deployed configuration, and, in the deployed configuration, the seatback cushion extends through the seatback frame.

In some cases, the seatback cushion is slidable relative to the seatback frame in the deployed configuration. In various aspects, the seatback cushion includes a top end and a bottom end, the bottom end is pivotally engaged with the seatback frame, and, in the deployed configuration, the bottom end of the seatback cushion extends through the seatback frame and the bottom end extends away from an aft side of the passenger seatback.

In various examples, the seatback cushion includes a forward surface, an aft surface, and a foot cover configurable between a stowed configuration and a deployed configuration when the seatback cushion is in the deployed configuration, and, in the deployed configuration of the foot cover, the foot cover defines a foot cavity configured to receive a foot of a passenger. According to various aspects, the passenger seat further includes a seat base, the seatback cushion is foldable relative to the seat base, and, in the deployed configuration, the forward surface of the seatback cushion faces the seat base. In some examples, the foot cover is forward of the seatback frame when the seatback cushion is in the deployed configuration. In certain aspects, the passenger seat is an economy class passenger seat.

According to various examples, a passenger seat arrangement includes a forward passenger seat with a passenger seatback. The passenger seatback includes a seatback frame and a seatback cushion. The seatback cushion is rotatable relative to the seatback frame between a stowed configuration and a deployed configuration. The passenger seat arrangement also includes an aft passenger seat with a seat base, and, in the deployed configuration, the seatback cushion of the forward passenger seat abuts the seat base of the aft passenger seat.

In certain cases, the seatback cushion is slidable relative to the seatback frame. In some aspects, in the deployed configuration, the seatback cushion extends through the seatback frame. According to various cases, in the deployed configuration, a portion of the seatback cushion extends forward relative to the seatback frame and a portion of the seatback cushion extends aft relative to the seatback frame.

In some examples, the seatback cushion includes a top end and a bottom end, and the bottom end of the seatback cushion abuts the seat base in the deployed configuration. In certain aspects, the forward passenger seat further includes a forward seat base, and, in the stowed configuration, the bottom end of the seatback cushion is adjacent to the forward seat base, and, in the deployed configuration, the bottom end of the seatback cushion is spaced apart from the forward seat base. In some aspects, the seatback cushion includes a forward surface, an aft surface, and a foot cover configurable between a stowed configuration and a deployed configuration when the seatback cushion is in the deployed configuration, and, in the deployed configuration of the foot cover, the foot cover defines a foot cavity configured to receive a foot of a passenger.

According to some examples, a method of reclining a passenger seat includes rotating a seatback cushion of a seatback of a passenger seat relative to a seatback frame of the seatback of the passenger seat, and positioning the seatback cushion relative to the seatback frame such that a portion of the seatback cushion extends through the seatback frame.

In some cases, positioning the seatback cushion includes sliding the seatback cushion relative to the seatback frame. In various aspects, positioning the seatback cushion includes abutting a bottom end of the seatback cushion with a seat base of an aft passenger seat. In various cases, the method includes deploying a foot cover from an aft side of the seatback cushion after positioning the seatback cushion relative to the seatback frame. In certain aspects, the method includes locking the position of the seatback cushion relative to the seatback frame with a cushion lock. In some examples, the method includes stowing the seatback cushion by positioning the seatback cushion such that the seatback cushion does not extend through the seatback frame, and rotating the seatback cushion relative to the seatback frame such that the seatback cushion is in a stowed configuration.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing. References herein to "consisting of" may, in at least some circumstances, encompass "consisting essentially of" or "comprising."

In some aspects, disclosed is a recliner sofa system for a passenger seat. The passenger seat includes a seatback and a seat base. The seatback includes a seatback frame and a seatback cushion. In various examples, the seatback cushion is rotatable relative to the seatback frame between a stowed configuration and a deployed configuration. In the stowed configuration, the seatback cushion is positioned within the seatback frame such that a passenger can sit in the passenger seat. In the deployed configuration, the seatback cushion is initially rotated forward relative to the seatback frame and then positioned such that the seatback cushion extends through the seatback frame. In certain aspects, a passenger cannot sit in the passenger seat when the seatback cushion is in the deployed configuration. Optionally, in the deployed configuration, the seatback cushion abuts the seat base of an aft passenger seat, and a passenger of the aft passenger seat can support his or her legs on the seatback cushion (optionally positioning them through the seatback frame). In some cases, a foot cover is configurable between a deployed configuration and a stowed configuration when the seatback cushion is in the deployed configuration. In the deployed configuration, the foot cover defines a foot cover cavity configured to receive and cover the feet of the passenger in the aft passenger seat.

Figure 5:
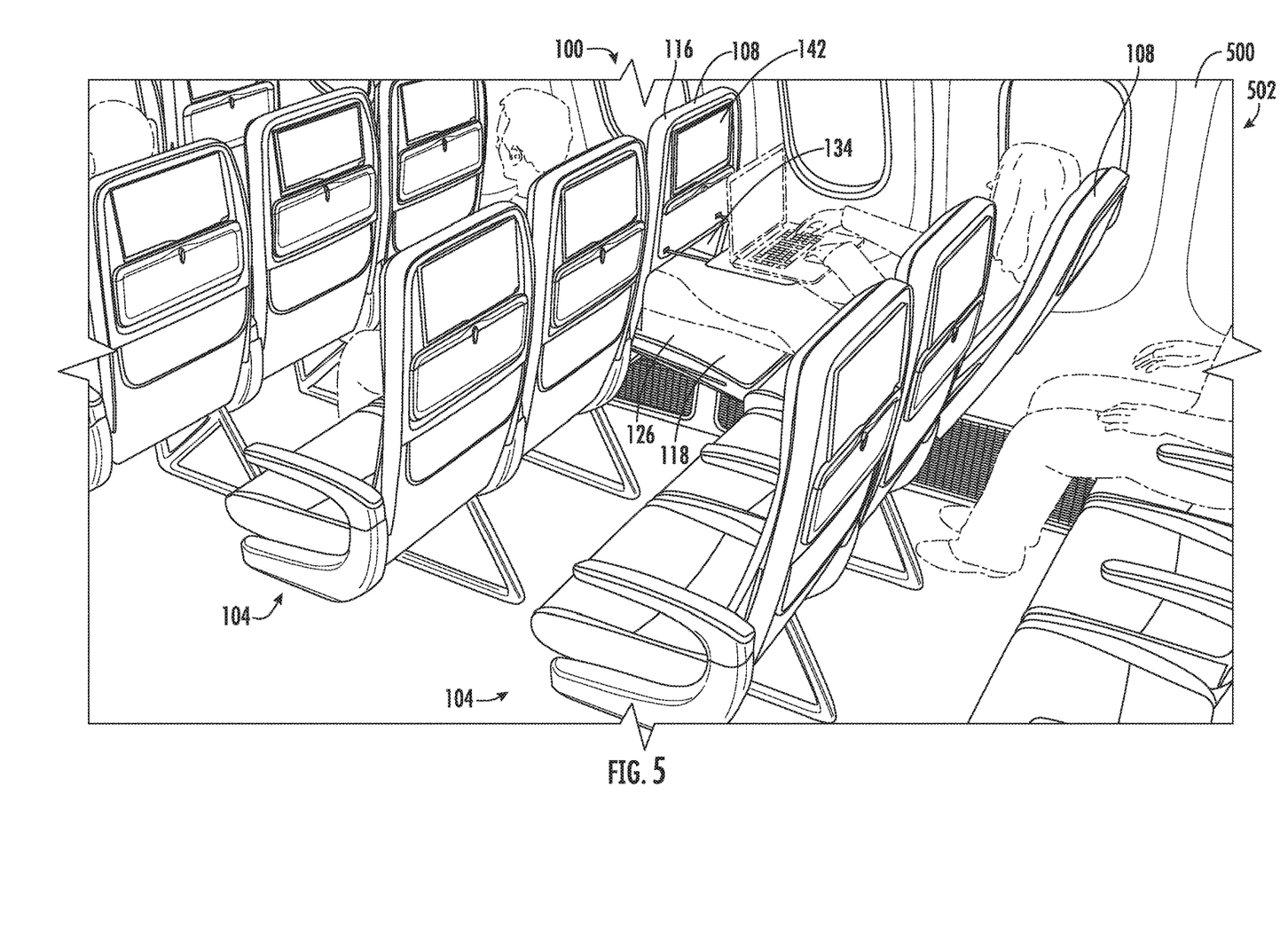
FIG. 5 is a perspective view of the passenger seat arrangement of FIG. 1 in an aircraft cabin.

FIGS. 1-5 illustrate an example of a passenger seat arrangement 100 with a recliner sofa system 102 according to aspects of the current disclosure. As illustrated in FIG. 5, in some aspects, the passenger seat arrangement 100 is provided in a cabin 502 of an aircraft 500, although it need not be.

Figure 1:
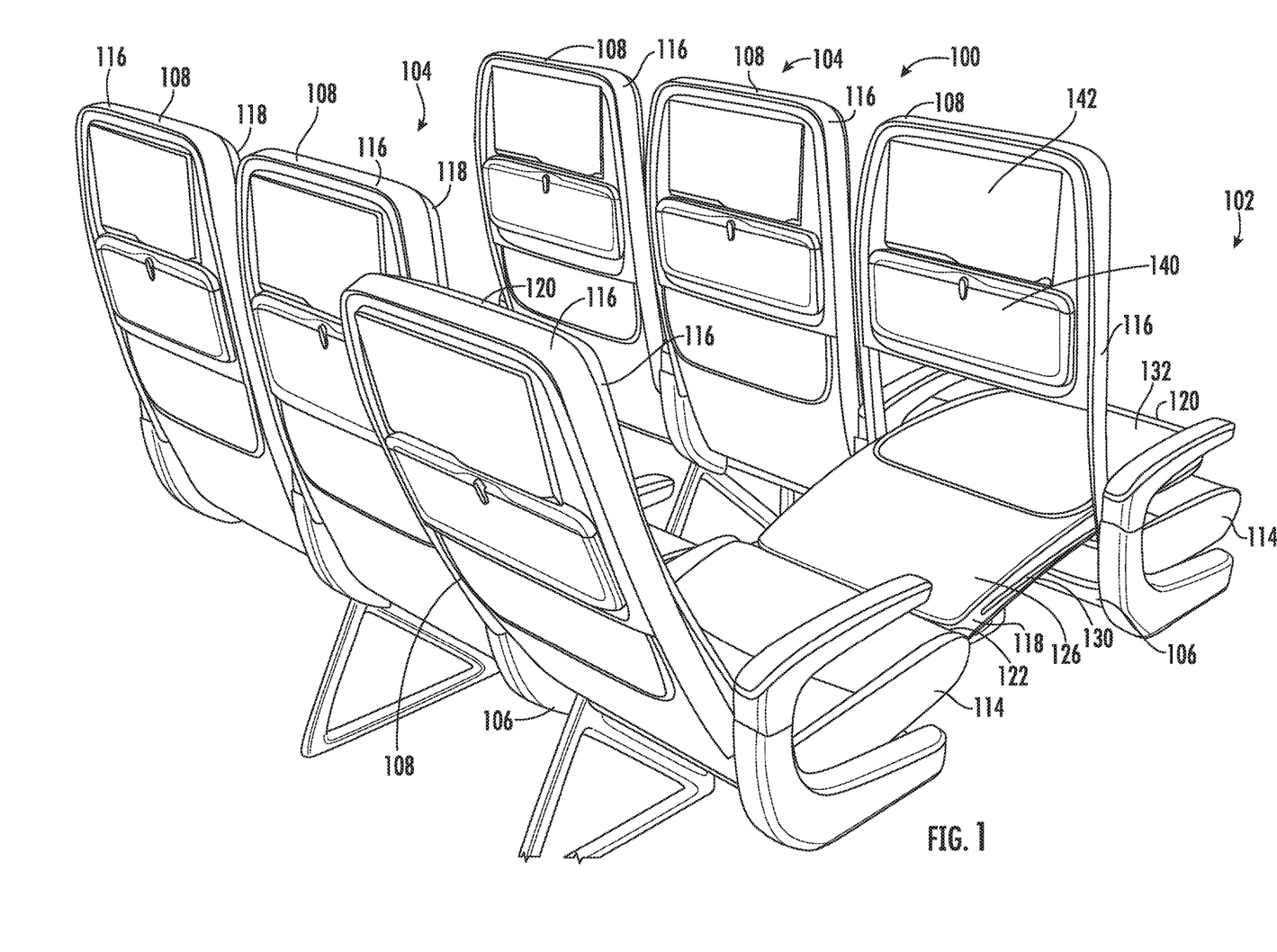
FIG. 1 is a perspective view of a passenger seat arrangement with a recliner sofa system according to aspects of the current disclosure.

The passenger seat arrangement 100 includes any number of passenger seat assemblies 104. In various examples, the passenger seat assemblies 104 are economy class passenger seat assemblies. Each passenger seat assembly 104 includes a base 106 and a seatback 108. In the present example, each passenger seat assembly 104 is capable of carrying a quantity of three passengers, and accordingly has three seatbacks 108. It will be appreciated that in various other examples, the passenger seat assembly 104 can be capable of carrying any desired number of passengers, such as one passenger, two passengers, three passengers, four passengers, or any other desired number of passengers. In these examples, the passenger seat assembly 104 can likewise have any desired number of corresponding seatback 108. The seat base 106 may include a number of base cushions 114 corresponding to the number of seatbacks 108, although it need not. In certain examples, the seat base 106 includes a base frame tube coupled to a leg assembly. Optionally, each seat assembly 104 may include a headrest, armrest, tray table 140, In-Flight Entertainment 142, and/or various other components as desired, although it need not.

Figure 2A:
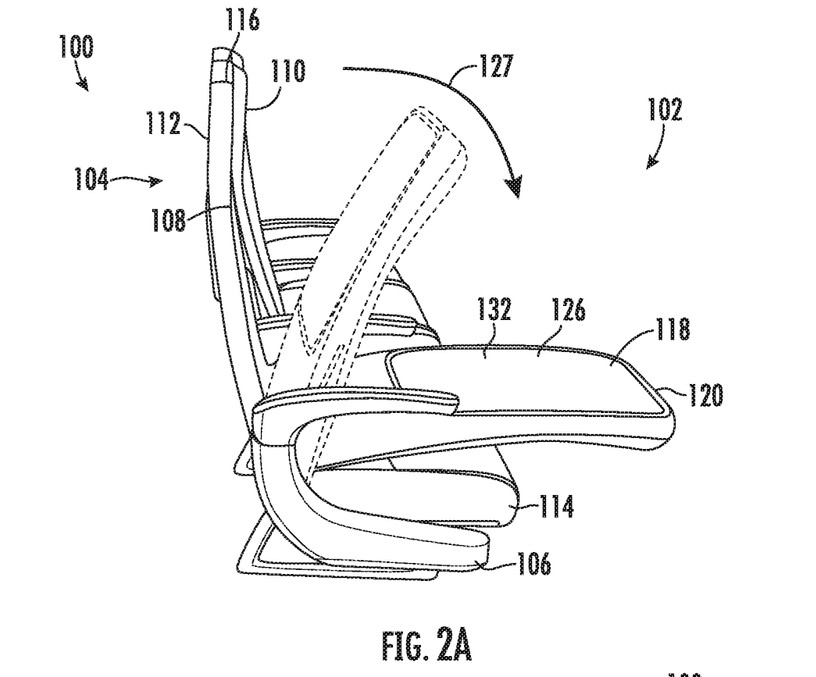
FIG. 2A is a perspective view of the passenger seat arrangement of FIG. 1 with a seatback cushion moved to a deployed configuration according to aspects of the current disclosure.
Figure 2B:
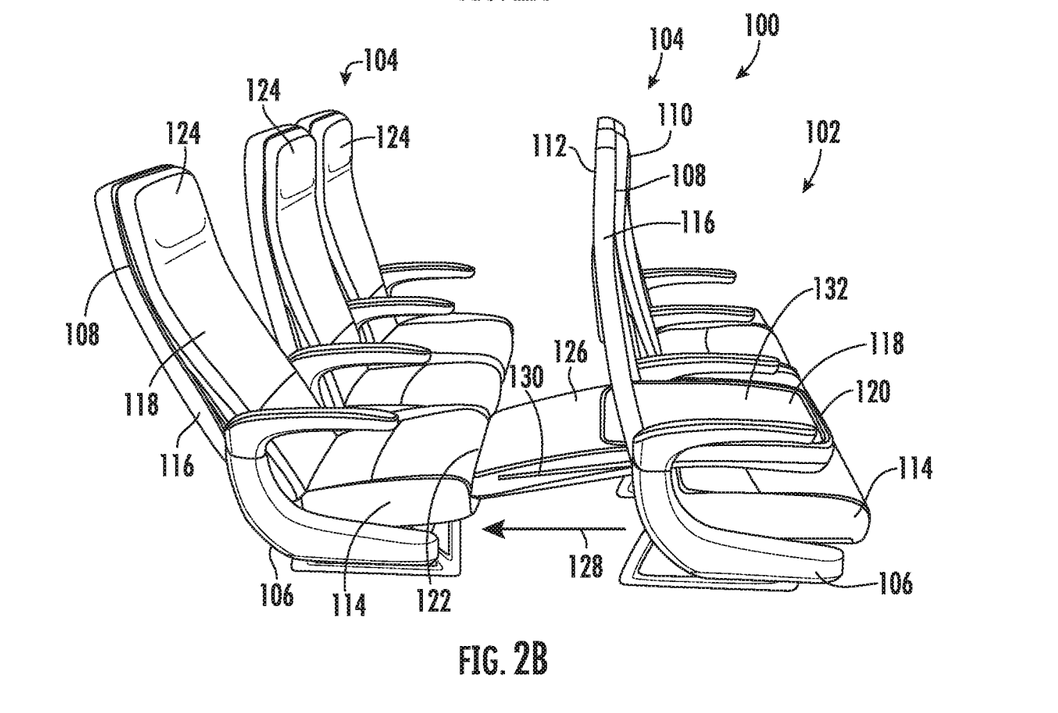
FIG. 2B is a perspective view of the passenger seat arrangement of FIG. 1 with the seatback cushion in a fully deployed configuration according to aspects of the current disclosure.
Figure 2C:
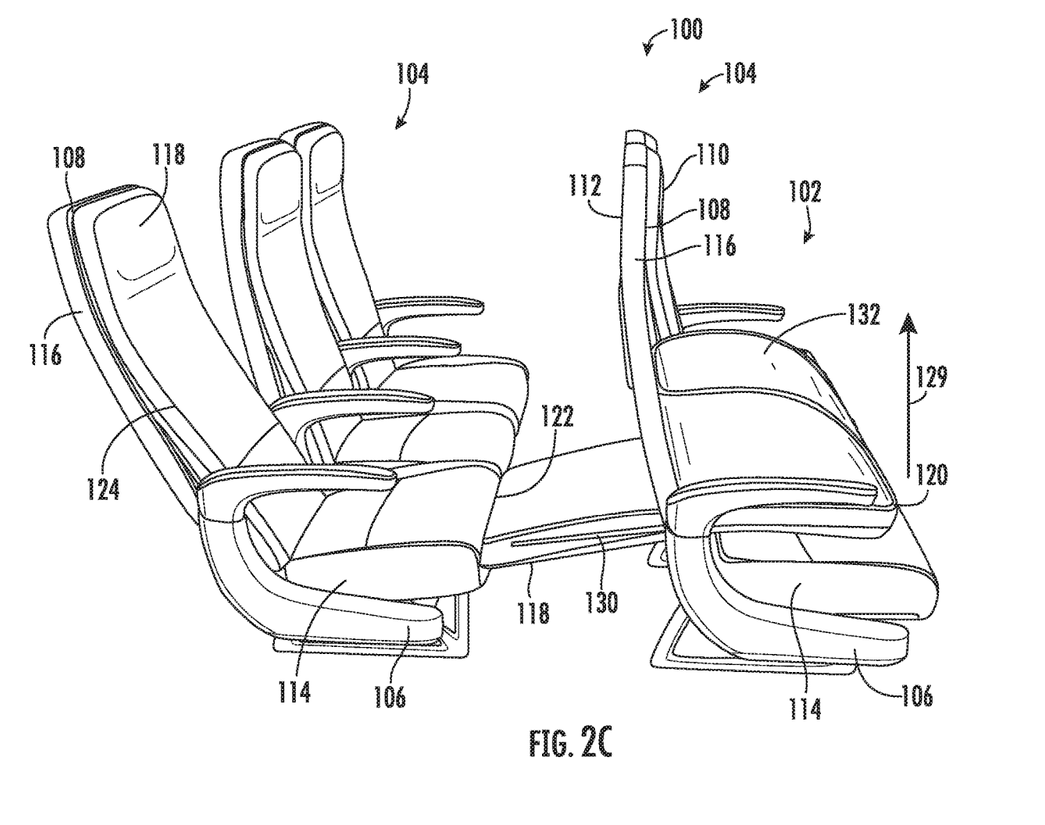
FIG. 2C is a perspective view of the passenger seat arrangement of FIG. 1 with a foot cover deployed according to aspects of the current disclosure.
Figure 3:
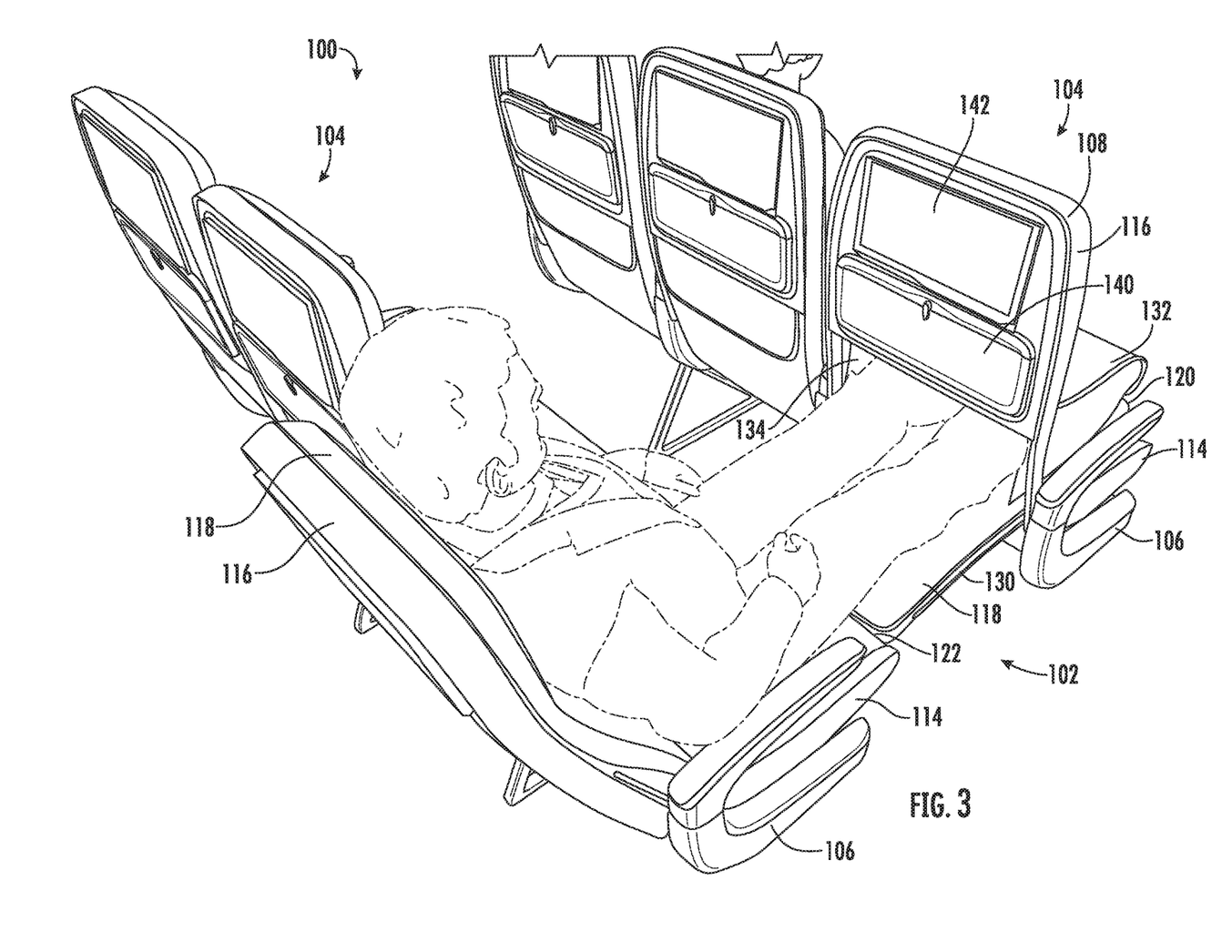
FIG. 3 is another perspective view of the passenger seat arrangement of FIG. 1.
Figure 4:
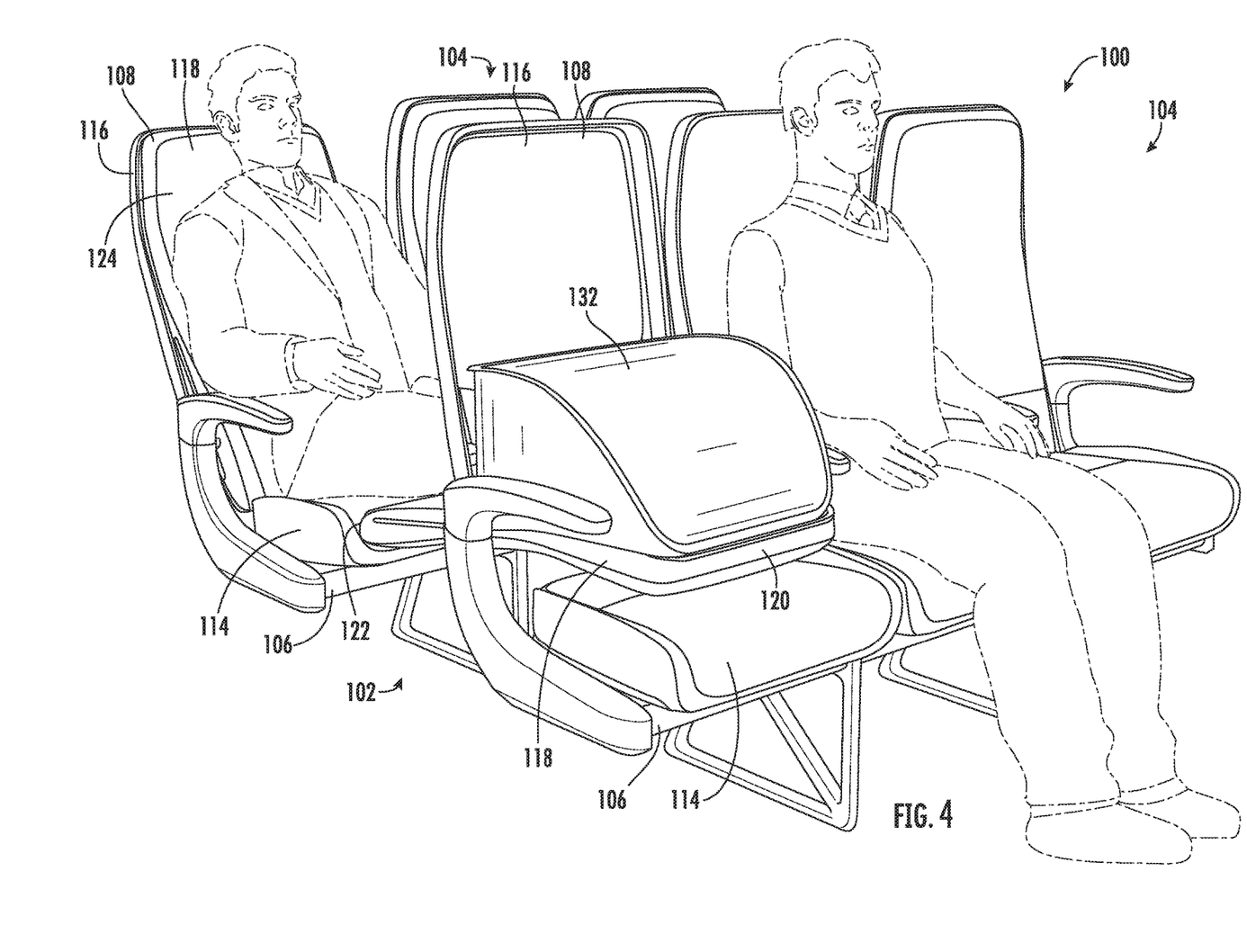
FIG. 4 is another perspective view of the passenger seat arrangement of FIG. 1.

Referring to FIGS. 2A-C, each seatback 108 includes a forward-facing side 110 and an aft-facing side 112. When used by the passenger, the forward-facing side 110 is a side against which a passenger may rest his or her back. The aft-facing side 112 generally faces away from the passenger when used. In various examples, passenger vehicles, such as aircraft, include rows of passenger seat assemblies 104, and the aft-facing side 112 of one passenger seat faces the passenger in the behind passenger seat.

Each seatback 108 includes a frame 116 and a cushion 118. The cushion 118 includes a top end 120, a bottom end 122, a forward-facing side 124, and an aft-facing side 126. The cushion 118 is independently positionable relative to the frame 116 and is configurable between a stowed configuration and a deployed configuration. In certain examples, the cushion 118 is rotatable relative to the frame 116 through various suitable rotational mechanisms such that the cushion 118 is movable between the stowed configuration and the deployed configuration. Various suitable rotational mechanisms include, but are not limited to, pivots, rollers, hinges, pins, or any other suitable mechanisms. In certain cases, the rotational mechanisms are provided at or near the bottom end 122 of the cushion 118 such that the top end 120 can rotate away from the frame 116.

In the stowed configuration, the aft-facing side 126 of the cushion 118 generally faces the same direction as the aft-facing side 112 and the forward-facing side 124 generally faces the same direction as the forward-facing side 110. In certain examples, in the stowed configuration, the bottom end 122 of the cushion 118 is adjacent to the cushion 114 of the seat base 106 corresponding that that seatback 108.

In the deployed configuration, as illustrated in FIG. 2B, the top end 120 of the cushion 118 is rotated away from the frame 116 (see, e.g., arrow 127). In some examples, in the deployed configuration, the cushion 118 is further positionable relative to the frame 116 (see, e.g., arrow 128). In various aspects, the cushion 118 is positionable in the deployed configuration with various suitable linear mechanisms including various bearings, rails, tracks, sliders, or other suitable mechanisms. In the present non-limiting example, opposite sides of the cushion 118 include sliding rails 130 such that the cushion 118 is positionable (e.g., slidable or otherwise movable) relative to the frame 116 in the deployed configuration. As illustrated in FIGS. 1, 2B, and 2C, in certain aspects, in the deployed configuration, the cushion 118 is positioned such that the cushion 118 extends through the frame 116. In various examples, the bottom end 122 of the cushion 118 extends through the frame 116 and away from the aft-facing side 112 of the seatback 108. In some cases, as best illustrated in FIGS. 2B and 2C, in the deployed configuration, a portion of the cushion 118 extends forward relative to the frame 116 and a portion of the cushion 118 extends aft relative to the frame 116. In certain cases, in the deployed configuration, the cushion 118 abuts the cushion 114 of an aft passenger seat assembly 104 (e.g., the immediately aft passenger seat assembly 104). As described in detail below, a passenger in the aft passenger seat assembly 104 may then utilize the deployed cushion 118 as a footrest or leg support. In some aspects, the bottom end 122 of the cushion 118 is spaced apart from its corresponding seat base 106 and may abut that cushion 114 of the aft passenger seat assembly 104.

Optionally, the cushion 118 includes a foot cover 132 that is configurable between a stowed configuration (see FIG. 2B) and a deployed configuration (see FIG. 2C) when the cushion 118 is in the deployed configuration (see arrow 129). In the deployed configuration, the foot cover 132 defines a cover cavity 134 into which a passenger may position his or her feet. Through the foot cover 132, a passenger may utilize the recliner sofa system 102 without disrupting passengers adjacent to the system 102. The foot cover 132 may include various collapsible materials such as various fabrics, plastics, or other materials that can change shape. In certain aspects, the foot cover 132 includes a material that visually conceals a passenger's feet. Optionally, the foot cover 132 includes various odor control materials. Various visual decals or other designs may be provided on the foot cover 132, including, but not limited to, airline logos or colors, signs or warnings that the seat is being used, etc.

Optionally, cushion locks may be provided with each cushion 118 such that the position of the cushion 118 may be secured in the stowed configuration or the deployed configuration. The cushion locks may be mechanical locks (e.g., keys or other suitable locks). In other examples, the cushion locks may be electronically controlled (e.g., unlocked by a switch on the passenger seat assembly 104, by a controller on or remote from the passenger seat assembly 104, etc.). In addition, the cushion 118 may optionally include supplementary structural supports to provide further support to a passenger's legs when used in the deployed configuration.

In certain examples, movement of the cushion 118 (and optionally the foot cover 132 may be controlled through various suitable electronic, mechanical, pneumatic, hydraulic, any combination thereof, or any other suitable mechanisms.

Through the recliner sofa system 102, a passenger seat assembly 104 can be transformed into a space suitable for a passenger to adopt a full recline position. In particular, through the independent movement of the cushion 118 relative to the frame 116 (as well as any IFE or the tray table), a generally horizontal sofa-style surface can be offered to an aft passenger seat to support his or her lower body in a more comfortable position. As such, an airline can optimize the usage of cabin space by adding value to the passenger's flight experience while also creating new revenue stream from an otherwise unoccupied seat. For example, during a flight, if a forward passenger seat is not occupied, the passenger in the aft seat may choose to upgrade his or her seat by paying a fee to move the forward cushion 118 into the deployed configuration. Alternatively, such a selection may be available when booking. In addition, the recliner sofa system 102 allows for airlines to quickly and easily customize which seats are in a standard economy configuration and which are in a premium configuration (e.g., with the deployed cushion).

A method of using the recliner sofa system is also provided. In various examples, the method includes unlocking the cushion from a frame of a seatback, although it need not. In certain aspects, unlocking the cushion may include receiving payment and sending an electronic signal, using a mechanical key, or various other suitable mechanisms. The method includes rotating the cushion relative to the frame such that the cushion is moved from the stowed configuration to the deployed configuration. The method also includes positioning the cushion relative to the frame such that a portion of the cushion extends through the frame. In some examples, positioning the cushion includes sliding the cushion relative to the frame. In various examples, positioning the cushion includes abutting a bottom end of the cushion with a seat base of an aft passenger seat. In certain cases, the method includes deploying a foot cover from an aft side of the cushion after positioning the cushion relative to the frame. The method may optionally include locking the position of the cushion relative to the frame with a cushion lock. After a passenger has used the recliner sofa system (e.g., at the end of a flight), the method may include stowing the cushion by positioning the cushion such that the cushion does not extend through the frame and rotating the cushion relative to the frame such that the cushion is in a stowed configuration.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat comprising a passenger seatback, the passenger seatback comprising a seatback frame and a seatback cushion, wherein the seatback cushion is rotatable relative to the seatback frame between a stowed configuration and a deployed configuration, and wherein, in the deployed configuration, the seatback cushion extends through the seatback frame.

EC 2. The passenger seat of any of the preceding or subsequent example combinations, wherein the seatback cushion is slidable relative to the seatback frame in the deployed configuration.

EC 3. The passenger seat of any of the preceding or subsequent example combinations, wherein the seatback cushion comprises a top end and a bottom end, wherein the bottom end is pivotally engaged with the seatback frame, and wherein, in the deployed configuration, the bottom end of the seatback cushion extends through the seatback frame and the bottom end extends away from an aft side of the passenger seatback.

EC 4. The passenger seat of any of the preceding or subsequent example combinations, wherein the seatback cushion comprises a forward surface, an aft surface, and a foot cover configurable between a stowed configuration and a deployed configuration when the seatback cushion is in the deployed configuration, and wherein, in the deployed configuration of the foot cover, the foot cover defines a foot cavity configured to receive a foot of a passenger.

EC 5. The passenger seat of any of the preceding or subsequent example combinations, further comprising a seat base, wherein the seatback cushion is foldable relative to the seat base, and wherein, in the deployed configuration, the forward surface of the seatback cushion faces the seat base.

EC 6. The passenger seat of any of the preceding or subsequent example combinations, wherein the foot cover is forward of the seatback frame when the seatback cushion is in the deployed configuration.

EC 7. The passenger seat of any of the preceding or subsequent example combinations, wherein the passenger seat is an economy class passenger seat.

EC 8. A passenger seat arrangement comprising: a forward passenger seat comprising a passenger seatback, the passenger seatback comprising a seatback frame and a seatback cushion, wherein the seatback cushion is rotatable relative to the seatback frame between a stowed configuration and a deployed configuration; and an aft passenger seat comprising a seat base, wherein, in the deployed configuration, the seatback cushion of the forward passenger seat abuts the seat base of the aft passenger seat.

EC 9. The passenger seat arrangement of any of the preceding or subsequent example combinations, wherein the seatback cushion is slidable relative to the seatback frame.

EC 10. The passenger seat arrangement of any of the preceding or subsequent example combinations, wherein, in the deployed configuration, the seatback cushion extends through the seatback frame.

EC 11. The passenger seat arrangement of any of the preceding or subsequent example combinations, wherein, in the deployed configuration, a portion of the seatback cushion extends forward relative to the seatback frame and a portion of the seatback cushion extends aft relative to the seatback frame.

EC 12. The passenger seat arrangement of any of the preceding or subsequent example combinations, wherein the seatback cushion comprises a top end and a bottom end, and wherein the bottom end of the seatback cushion abuts the seat base in the deployed configuration.

EC 13. The passenger seat arrangement of any of the preceding or subsequent example combinations, wherein the forward passenger seat further comprises a forward seat base, wherein, in the stowed configuration, the bottom end of the seatback cushion is adjacent to the forward seat base, and wherein, in the deployed configuration, the bottom end of the seatback cushion is spaced apart from the forward seat base.

EC 14. The passenger seat arrangement of any of the preceding or subsequent example combinations, wherein the seatback cushion comprises a forward surface, an aft surface, and a foot cover configurable between a stowed configuration and a deployed configuration when the seatback cushion is in the deployed configuration, and wherein, in the deployed configuration of the foot cover, the foot cover defines a foot cavity configured to receive a foot of a passenger.

EC 15. A method of reclining a passenger seat comprising: rotating a seatback cushion of a seatback of a passenger seat relative to a seatback frame of the seatback of the passenger seat; and positioning the seatback cushion relative to the seatback frame such that a portion of the seatback cushion extends through the seatback frame.

EC 16. The method of any of the preceding or subsequent example combinations, wherein positioning the seatback cushion comprises sliding the seatback cushion relative to the seatback frame.

EC 17. The method of any of the preceding or subsequent example combinations, wherein positioning the seatback cushion comprises abutting a bottom end of the seatback cushion with a seat base of an aft passenger seat.

EC 18. The method of any of the preceding or subsequent example combinations, further comprising deploying a foot cover from an aft side of the seatback cushion after positioning the seatback cushion relative to the seatback frame.

EC 19. The method of any of the preceding or subsequent example combinations, further comprising locking the position of the seatback cushion relative to the seatback frame with a cushion lock.

EC 20. The method of any of the preceding or subsequent example combinations, further comprising stowing the seatback cushion by: positioning the seatback cushion such that the seatback cushion does not extend through the seatback frame; and rotating the seatback cushion relative to the seatback frame such that the seatback cushion is in a stowed configuration.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A passenger seat comprising a passenger seatback, the passenger seatback comprising a seatback frame and a seatback cushion, wherein the seatback cushion comprises a top end and a bottom end, wherein the seatback cushion is rotatable relative to the seatback frame between a stowed configuration and a deployed configuration, and wherein, in the deployed configuration, the seatback cushion extends through the seatback frame and the bottom end of the seatback cushion is spaced apart from the seatback frame in an aft direction.

2. The passenger seat of claim 1, wherein the seatback cushion is slidable relative to the seatback frame in the deployed configuration.

3. The passenger seat of claim 1, wherein the bottom end of the seatback cushion is pivotally engaged with the seatback frame.

4. The passenger seat of claim 1, wherein the seatback cushion comprises a forward surface, an aft surface, and a foot cover configurable between a stowed configuration and a deployed configuration when the seatback cushion is in the deployed configuration, and wherein, in the deployed configuration of the foot cover, the foot cover defines a foot cavity configured to receive a foot of a passenger.

5. The passenger seat of claim 4, further comprising a seat base, wherein the seatback cushion is foldable relative to the seat base, and wherein, in the deployed configuration, the forward surface of the seatback cushion faces the seat base.

6. The passenger seat of claim 4, wherein the foot cover is forward of the seatback frame when the seatback cushion is in the deployed configuration.

7. The passenger seat of claim 1, wherein the passenger seat is an economy class passenger seat.

8. A passenger seat arrangement comprising:
a forward passenger seat comprising a passenger seatback, the passenger seatback comprising a seatback frame and a seatback cushion, wherein the seatback cushion comprises a top end and a bottom end and is rotatable relative to the seatback frame between a stowed configuration and a deployed configuration, and wherein the seatback cushion is slidable relative to the seatback frame when the seatback cushion is in the deployed position; and
an aft passenger seat comprising a seat base,
wherein, in the deployed configuration, the bottom end of the seatback cushion of the forward passenger seat is spaced apart from the seatback frame of the forward passenger seat and abuts the seat base of the aft passenger seat.

9. The passenger seat arrangement of claim 8, wherein, in the deployed configuration, the seatback cushion extends through the seatback frame.

10. The passenger seat arrangement of claim 9, wherein, in the deployed configuration, a portion of the seatback cushion extends forward relative to the seatback frame and a portion of the seatback cushion extends aft relative to the seatback frame.

11. The passenger seat arrangement of claim 8, wherein the forward passenger seat further comprises a forward seat base, wherein, in the stowed configuration, the bottom end of the seatback cushion is adjacent to the forward seat base, and wherein, in the deployed configuration, the bottom end of the seatback cushion is spaced apart from the forward seat base.

12. The passenger seat arrangement of claim 8, wherein the seatback cushion comprises a forward surface, an aft surface, and a foot cover configurable between a stowed configuration and a deployed configuration when the seatback cushion is in the deployed configuration, and wherein, in the deployed configuration of the foot cover, the foot cover defines a foot cavity configured to receive a foot of a passenger.

13. A method of reclining a passenger seat comprising:
rotating a seatback cushion of a seatback of a passenger seat relative to a seatback frame of the seatback of the passenger seat, wherein the seatback cushion comprises a top end and a bottom end; and
positioning the seatback cushion relative to the seatback frame such that a portion of the seatback cushion extends through the seatback frame and the bottom end of the seatback cushion is spaced apart from the seatback frame in an aft direction.

14. The method of claim 13, wherein positioning the seatback cushion comprises sliding the seatback cushion relative to the seatback frame.

15. The method of claim 13, wherein positioning the seatback cushion comprises abutting the bottom end of the seatback cushion with a seat base of an aft passenger seat.

16. The method of claim 13, further comprising deploying a foot cover from an aft side of the seatback cushion after positioning the seatback cushion relative to the seatback frame.

17. The method of claim 13, further comprising locking the position of the seatback cushion relative to the seatback frame with a cushion lock.

18. The method of claim 13, further comprising stowing the seatback cushion by:
positioning the seatback cushion such that the seatback cushion does not extend through the seatback frame; and
rotating the seatback cushion relative to the seatback frame such that the seatback cushion is in a stowed configuration.

* * * * *